United States Patent Office 2,962,370
Patented Nov. 29, 1960

2,962,370
PROCESS FOR CONCENTRATING GALLIUM OXIDE

Luther M. Foster and George Long, New Kensington, Pa., assignors to Aluminum Company of America, Pittsburgh, Pa., a corporation of Pennsylvania No Drawing. Filed Feb. 20, 1959, Ser. No. 794,506

3 Claims. (Cl. 75—1)

This invention relates to processes for recovering gallium, and more particularly, to a method for concentrating gallium associated with alumina, including recovering gallium from ores and other materials in which a relatively small proportion of gallium is present together with much larger proportions of alumina and other substances.

Gallium is present in small concentrations in various alumina-bearing materials. Bauxite usually contains a few hundredths of a percent of gallium oxide by weight. Coal ash sometimes contains as much as a few tenths of a percent of gallium oxide, as well as substantial amounts of alumina, lime, silica, magnesia, iron oxide, and titania. Also, the fine dust or "fume" evolved from the electrolytic cells for the production of aluminum by reduction of alumina dissolved in a fluoride electrolyte usually contains a few hundredths of a percent of gallium oxide, together with considerably larger amounts of alumina, carbon, soda, lime, iron oxide, sulfur, silica, and fluorides.

Likewise, in various processes for the recovery of gallium values gallium oxide "concentrates" are produced in which the proportion of gallium oxide is less than one percent, and is quite small as compared with the proportion of alumina in the concentrate. For example, in the primary commercial process for producing gallium in the United States, Bayer process liquor from the caustic digestion of bauxite, and from which a substantial portion of the alumina has previously been precipitated, is gassed with carbon dioxide to co-precipitate alumina and gallium oxide, after which the co-precipitate is dissolved in caustic soda solution. The co-precipitate contains about 0.3 to 0.5 percent by weight of gallium oxide ($Ga_2O_3$), together with much larger amounts of alumina, silica, and soda ($Na_2O$), as well as potassium oxide, lime, and iron oxide.

Although the gallium content in the various materials mentioned above is generally assumed to be in the form of gallium sesquioxide, the exact nature of the gallium values is not fully known. They may be present as other compounds than the sesquioxide, such as complexes with other compounds. However, for convenience the gallium values in such materials will be referred to herein as gallium oxide.

Recovery of gallium oxide from such materials has been made difficult and expensive by the small concentration of gallium oxide present, and by the intimate association therewith of substantial proportions of alumina, silica, lime, iron oxide, titania, soda, and other compounds. Alumina and gallium oxide have marked similarities which make it particularly difficult to recover gallium oxide from materials containing a large concentration of alumina.

It is an object of this invention to provide a process for recovering gallium oxide from materials containing alumina and gallium oxide. It is a further object of this invention to provide such a process in which gallium oxide is recovered together with alumina, the ratio of gallium oxide to alumina recovered being higher than the ratio of gallium oxide to alumina in the starting material.

We have discovered that gallium oxide can be recovered from alumina-bearing materials, such as aluminum ores, fly ash, co-precipitates of alumina and gallium oxide, and fume or dust evolved from electrolytic cells for the production of aluminum, by a method in which the said material is heated in a reducing atmosphere at a temperature above 1000° C. to volatilize therefrom gallium oxide and alumina, which are thereafter condensed in the form of a condensate in which the molecular ratio of gallium oxide to alumina is substantially higher than in the material subjected to the heating operation mentioned.

The reducing atmosphere may be provided by conducting the heating operation in an excess of carbon to form carbon monoxide, or by passing a reducing gas such as methane, hydrogen or carbon monoxide through the heating chamber. The system is desirably enclosed to prevent oxidizing atmosphere from entering into the heating zone or contacting the vapors in their travel to the condensing zone.

Although the temperature may be as low as 1000° C., the treatment is preferably carried out above 1100° C. because the rate of volatilization tends to increase with temperature; however, it is generally unnecessary to operate above about 1300° C. The higher the temperature, the shorter the period of treatment. The temperature to be employed, and the duration of the heating operation, depend to some extent on the physical state of the material being heated. In general, a heating period of from 0.25 to 5 hours is sufficient, a preferred temperature and time of treatment being 0.5 to 3.0 hours at 1100 to 1300° C. Agitation of the material being treated is desirable to facilitate heat distribution and to promote contact of the material with the reducing environment.

The mechanism for the volatilization of the gallium values is not completely understood. If they are assumed to exist as gallium sesquioxide ($Ga_2O_3$) in the material being heated, it is possible that they are reduced to a volatile sub-oxide, either GaO or $Ga_2O$. However, as mentioned previously, the nature of the gallium compound in the starting material is not fully known, and the gallium compounds may exist as complexes with other compounds. Despite the fact that alumina in the material heated volatilizes at the conditions of the process, presumably as a suboxide, and the condensate contains alumina in substantial proportions, the process results in substantial concentration of the gallium values into a relatively concentrated and purified gallium oxide-containing material. Such concentrates may be dissolved in caustic soda solution, for electrolytic production of metallic gallium.

The following examples illustrate the use of our invention to recover a gallium-rich condensate of relatively high-purity.

*Example 1*

A co-precipitate obtained by gassing with $CO_2$ a Bayer process liquor produced by caustic digestion of bauxite followed by precipitation of a large proportion of the alumina therefrom, and containing 0.47 percent by weight of gallium values (as $Ga_2O_3$), 40.3 percent alumina, 16.4 percent sodium values (as $Na_2O$), water (free and combined), and small percentages of silica, iron oxide, potassium oxide and lime, was heated in a graphite crucible with 0.2 part by weight of graphite at a temperature of 1100° C. for 1.75 hours. Nitrogen was passed through the crucible and then over a water-cooled condenser to which the vapors evolved were conducted for condensation. The condensate was found to contain 42.4 percent by weight of gallium oxide ($Ga_2O_3$). Spectrographic analysis indicated the other major element to be sodium, with potassium and aluminum in the 1–10 percent range, and silicon, iron, and calcium in the 0.1–1 percent range.

*Example 2*

Bauxite containing (by weight) 50.8% $Al_2O_3$, 12.4% $SiO_2$, 5.4% $Fe_2O_3$, 1.9% $TiO_2$, 0.01% $Ga_2O_3$, 27.2% $H_2O$, and such minor impurities as oxides of potassium, tin, lead, sodium, lithium, copper, zinc, indium, boron, thallium, silver, and calcium, was crushed to −100 +200 mesh and mixed with 0.15 parts of graphite to serve as a reducing agent. The mixture was heated at 1100° C. for 0.75 hours in a graphite crucible, while passing nitrogen through the crucible. The vapors evolved and the nitrogen stream were conducted to a water-cooled condenser. The condensate from the water-cooled condenser was subjected to qualitative spectrographic analysis and the following results obtained:

10–100 percent range—Gallium, lead, tin and sodium.
1–10 percent range—Arsenic and potassium.
0.1–1 percent range—Lithium, zinc, copper, bismuth indium, boron.
0.01–0.1 percent range—Aluminum, thallium, silver, calcium, silicon.

*Example 3*

A co-precipitate as described in Example 1 was heated for 1.5 hours at a temperature of 1100° C. in apparatus comprising the crucible and condenser referred to in Example 1, while passing natural gas through the system at a flow rate of 400 cubic feet per kilogram per hour. The natural gas and/or its decomposition products provided a reducing atmosphere in the system. The condensate was found to contain 38.35 percent by weight of gallium oxide ($Ga_2O_3$), the other major elements being sodium, aluminum and potassium.

Having thus described the invention, we claim:

1. The process of concentrating gallium oxide, comprising heating solid material containing gallium oxide and alumina under reducing conditions at a temperature above 1000° C. to volatilize gallium oxide and alumina therefrom, conducting the resultant volatilized gallium oxide and alumina under reducing conditions to a condensing zone and condensing them in the said zone, the molecular ratio of gallium oxide to alumina in the condensate being higher than the ratio of gallium oxide to alumina in the said alumina-bearing material.

2. The process in accordance with claim 1, wherein the said alumina-bearing material is heated at 1000–1300° C.

3. The process in accordance with claim 1, wherein the said alumina-bearing material is heated at 1000–1300° C. for 0.25–5 hours.

References Cited in the file of this patent

Powell et al.: "The Extraction and Refining of Germanium and Gallium," Journal of Applied Chemistry, December 1, 1951 (page 542 relied on), pp. 541–551.